United States Patent
Hellring et al.

(10) Patent No.: US 10,173,176 B2
(45) Date of Patent: Jan. 8, 2019

(54) METHOD FOR PREPARING A RESIN-TREATED MICROPOROUS MEMBRANE

(71) Applicant: PPG Industries Ohio, Inc., Cleveland, OH (US)

(72) Inventors: Stuart D. Hellring, Pittsburgh, PA (US); Elizabeth A. Furar, Pittsburgh, PA (US); Robin M. Peffer, Valencia, PA (US); Michael Sandala, Pittsburgh, PA (US); Shawn Duffy, Cheswick, PA (US); Peter L. Votruba-Drzal, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 652 days.

(21) Appl. No.: 14/699,219

(22) Filed: Apr. 29, 2015

(65) Prior Publication Data
US 2016/0317974 A1 Nov. 3, 2016

(51) Int. Cl.
| | |
|---|---|
| *B01D 67/00* | (2006.01) |
| *B01D 69/14* | (2006.01) |
| *B01D 71/26* | (2006.01) |
| *C25D 13/12* | (2006.01) |
| *B01D 71/02* | (2006.01) |
| *C02F 1/44* | (2006.01) |
| *C09D 5/44* | (2006.01) |
| *B01D 61/14* | (2006.01) |

(52) U.S. Cl.
CPC ..... *B01D 67/0079* (2013.01); *B01D 67/0088* (2013.01); *B01D 69/141* (2013.01); *B01D 69/148* (2013.01); *B01D 71/027* (2013.01); *B01D 71/26* (2013.01); *C02F 1/44* (2013.01); *C09D 5/4411* (2013.01); *C09D 5/4434* (2013.01); *C25D 13/12* (2013.01); *B01D 61/145* (2013.01); *B01D 2323/21* (2013.01); *B01D 2323/35* (2013.01); *B01D 2323/46* (2013.01); *B01D 2325/14* (2013.01); *B01D 2325/16* (2013.01)

(58) Field of Classification Search
CPC .............. B01D 67/0079; B01D 69/148; B01D 71/027; B01D 71/26; B01D 69/141; B01D 67/0088; B01D 2323/35; B01D 61/145; B01D 2323/21; B01D 2325/16; B01D 2323/46; B01D 2325/14; C09D 5/4434; C09D 5/4411; C02F 1/44; C25D 13/12
See application file for complete search history.

(56) References Cited

U.S. PATENT DOCUMENTS

| | | |
|---|---|---|
| 4,294,677 A | 10/1981 | Sakagami et al. |
| 4,861,644 A | 8/1989 | Young et al. |
| 7,632,590 B2 | 12/2009 | Punsalan et al. |
| 8,632,878 B2 | 1/2014 | Parrinello et al. |
| 2002/0172871 A1 | 11/2002 | Schucker |
| 2003/0134177 A1 | 7/2003 | Furuya |

(Continued)

FOREIGN PATENT DOCUMENTS

| | | |
|---|---|---|
| EP | 1498976 A2 | 1/2005 |
| WO | 0078850 A1 | 12/2000 |

*Primary Examiner* — Taiwo Oladapo
(74) *Attorney, Agent, or Firm* — Charles E. Yeomans

(57) ABSTRACT

A method for preparing a resin-treated microporous membrane by electrodeposition is disclosed.

12 Claims, 6 Drawing Sheets

(56) References Cited

U.S. PATENT DOCUMENTS

| | | | |
|---|---|---|---|
| 2005/0287348 A1* | 12/2005 | Faler | B32B 5/18 |
| | | | 428/315.5 |
| 2011/0147308 A1 | 6/2011 | Johnston-Hall et al. | |
| 2014/0069862 A1* | 3/2014 | Guo | B01D 67/002 |
| | | | 210/500.29 |
| 2014/0170303 A1 | 6/2014 | Rayner et al. | |
| 2014/0246356 A1 | 9/2014 | Guo et al. | |

* cited by examiner

METHOD FOR PREPARING A RESIN-TREATED MICROPOROUS MEMBRANE

FIELD OF THE INVENTION

The present invention relates to a method for preparing a resin-treated microporous membrane and to a resultant membrane. More specifically, the present invention relates to a method of electrodepositing a resinous material on the surface of and/or within the pores of a microporous membrane.

BACKGROUND OF THE INVENTION

Microporous membranes comprising a hydrophobic polymeric matrix with a hydrophilic, finely divided, particulate filler distributed throughout the matrix are well known. Such materials are available from PPG Industries under the trademark TESLIN®. With TESLIN membranes, the polymeric matrix is a polyolefin such as polyethylene and the filter is a siliceous material such as fumed silica. These membranes have a network of interconnecting pores communicating throughout the microporous membrane. These membranes have interesting properties and have been used in stationery and signage applications as well as being used in filtration applications.

SUMMARY OF THE INVENTION

The present invention relates to a method for preparing a resin-treated microporous membrane comprising a polyolefin matrix material, finely divided, siliceous filler distributed throughout the matrix material and a network of interconnecting pores communicating throughout the microporous membrane; the method comprises:
(a) coupling the microporous membrane to a charged electrode,
(b) disposing the microporous membrane and the charged electrode into an aqueous dispersion of ionic resinous material; the dispersion also containing an oppositely charged counter electrode forming an electrical circuit with the charged electrode,
(c) passing electric current between the charged electrode and the counter electrode to cause the ionic resinous material to migrate to the microporous membrane.

The invention also relates to a microporous membrane comprising a polyolefin matrix material and finely divided, siliceous filter distributed throughout the matrix material, and a network of interconnecting pores communicating throughout the microporous membrane; the membrane having a resinous material electrodeposited within the pores of the membrane.

The invention also relates to a method of treating wastewater streams containing ionic materials comprising passing the stream through a microporous membrane comprising a matrix material, finely divided, siliceous filler distributed throughout the matrix material and a network of interconnecting pores communicating through the microporous membrane; the membrane having a resinous material electrodeposited on the surface and/or within the pores of the membrane.

Clauses

1. A method for preparing a resin-treated microporous membrane comprising a polyolefin matrix material, and finely divided, siliceous filler distributed throughout the matrix material, and a network of interconnecting pores communicating throughout the microporous membrane; the method comprising:
(a) coupling the microporous membrane to a charged electrode,
(b) disposing the microporous membrane and the charged electrode into an aqueous dispersion of an ionic resin; the resinous dispersion also containing an oppositely charged or counter electrode forming an electrical circuit with the charged electrode,
(c) passing electric current between the charged electrode and the counter electrode to cause the ionic resinous material to migrate to the charged electrode and consequently to the microporous membrane.

2. The method of clause 1 wherein the resin is electrodeposited on the surface of the microporous membrane.

3. The method of any of clauses 1 or 2 wherein the resin is electrodeposited in the pores of the microporous membrane.

4. The method of any of clauses 1-3 in which the polyolefin matrix material comprises polyethylene.

5. The method of clause 4 in which the polyethylene has an intrinsic viscosity of at least 18 deciliters per gram.

6. The method of any of clauses 1-5 in which the siliceous material is fumed silica.

7. The method of clause 6 in which the silica has an volume average gross particle size ranging from 1 to 300 micrometers.

8. The method of any of clauses 1-7 in which the siliceous filler is present in the matrix material in amounts of at least 50 percent by weight based on total weight of the membrane.

9. The method of any of clauses 1-8 in which the pores of the membrane have a volume average diameter of 0.02 to 0.5 micrometer.

10. The method of any of clauses 1-9 in which the ionic resin is a cationic resin and the charged electrode is a cathode.

11. The method of any of clauses 1-9 wherein the ionic resin is an anionic resin and the charged electrode is an anode.

12. The method of any of clauses 1-11 in which the microporous membrane is stretched in a single direction or in two directions.

13. A microporous membrane comprising a polyolefin matrix material, finely divided, siliceous material distributed throughout the matrix material and a network of interconnecting pores communicating throughout the microporous membrane; the membrane having a resin electrodeposited within the pores of the membrane.

14. The microporous membrane of clause 13 in which the membrane, the polyolefin matrix material, the siliceous material, the pores and the resin are defined as in any of the clauses 2-12.

15. A method of treating wastewater streams containing ionic materials comprising passing the stream through a microporous membrane according to any of clauses 13 or 14.

DETAILED DESCRIPTION

Other than in any operating examples, or where otherwise indicated, all numbers expressing quantifies of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include ail sub-ranges subsumed therein. For example, a range of "1 to 10" is intended to include ail sub-ranges between (and including) the recited minimum value of 1 and the recited maximum value of 10, that is, having a minimum value equal to or greater than 1 and a maximum value of equal to or less than 10.

As used in this specification and the appended claims, the articles "a", "an", and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers.

As used herein, "microporous material" or "microporous sheet" or "microporous membrane" means a material having a network of interconnecting pores.

Figure 1:
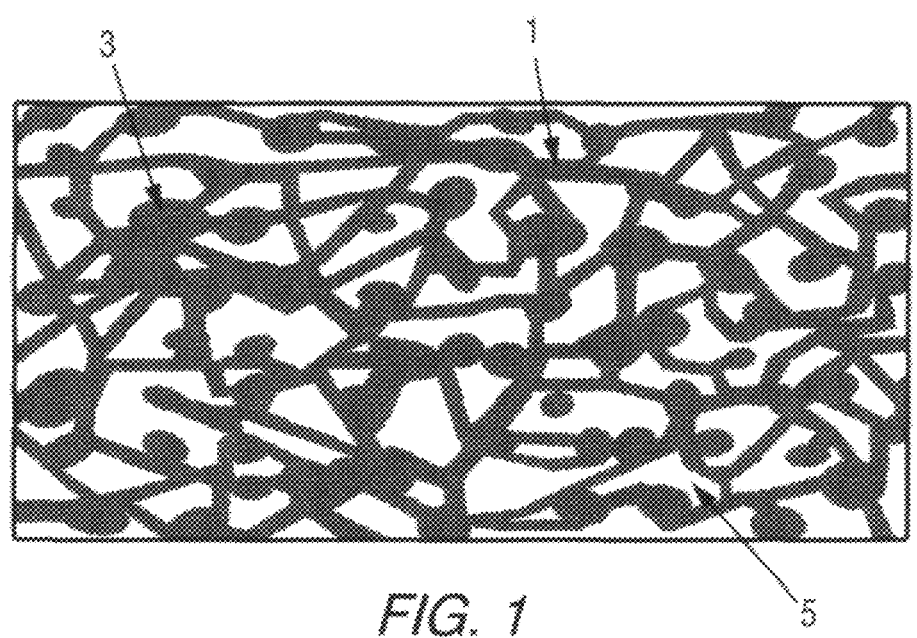
FIG. 1 represents a microporous membrane material used in the present invention.
Figure 2:
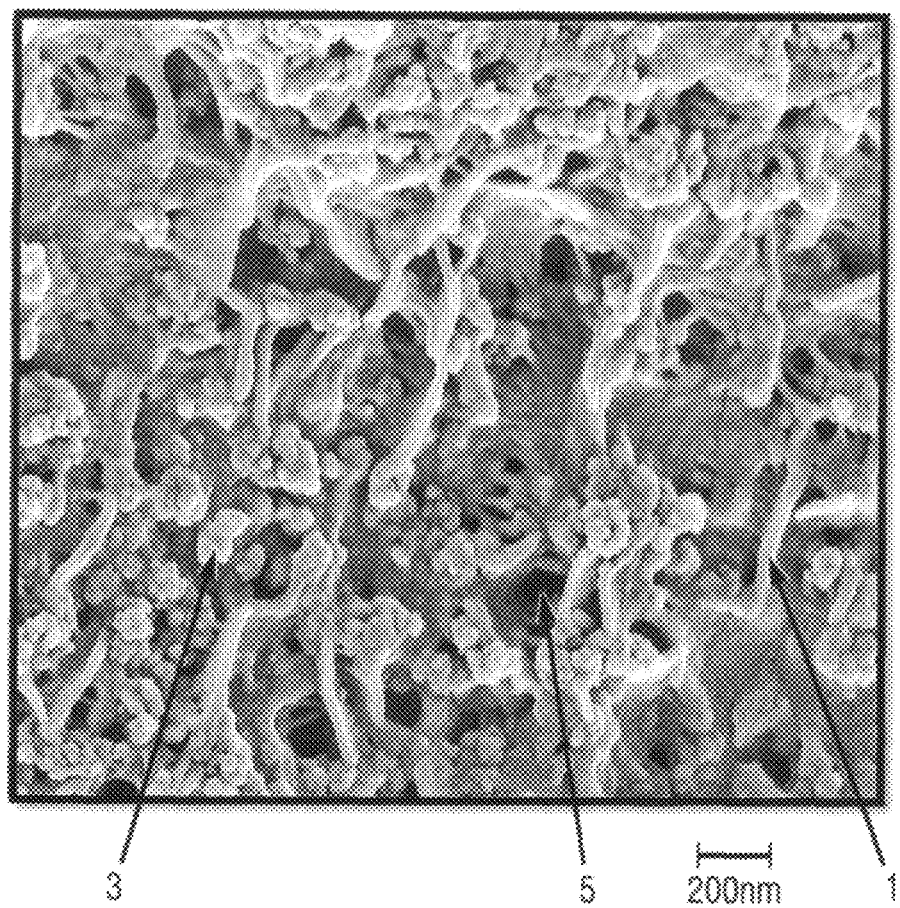
FIG. 2 is a photomicrograph of the microporous membrane material.

With reference to FIGS. 1 and 2, the matrix material comprises polyolefin fibrils 1 and distributed throughout the matrix finely divided siliceous filler 3. The membrane also has a network of interconnecting pores 5 that are in communication throughout the membrane.

The polyolefin fibrils are typically high molecular weight polymers, typically polyethylene and polypropylene. The intrinsic viscosity of the high molecular weight polyethylene can range from 18 to 39 deciliters per gram. The intrinsic viscosity of the high molecular weight polypropylene can range from 7 to 16 deciliters per gram. The intrinsic viscosity can be determined in accordance with the method set forth in US 2014/0246356A1, paragraphs [0040]-[0043].

The polyolefin typically constitutes from 10 to 50, such 20 to 40 percent by weight of the membrane material based on total weight of the membrane.

The finely divided siliceous filler distributed throughout the matrix material can be a precipitated or a fumed silica. The volume average gross particle size is typically from 1 to 300 nanometers, as determined by transmission electron microscopy. The siliceous filler typically constitutes 50 to 90, such as 60 to 80 percent by weight based on total weight of the membrane.

The microporous membrane also comprises a network of interconnecting pores communicating throughout the microporous material. Such pores constitute at least 15 percent, such as at least 35 percent, typically from 35 to 75 percent by volume of the microporous material. The porosity or void volume of the microporous material can be determined in accordance with the method set forth in US 2014/0246356A1, paragraph [0086]. The volume average diameter or the mean pore size of the pores is typically less than 1, such as 0.001 to 0.7, such as 0.02 to 0.5 micrometers. The volume average diameter can be determined in accordance with paragraphs [0087]-[0089] of US 2014/0246356A1.

The microporous membrane material is available in sheet or film form, particularly as a continuous sheet or film having a thickness ranging from 17 to 480 microns.

In an exemplary manufacturing process, the material is formed into a sheet or film, and a continuous sheet or film formed by a die is forwarded to a pair of heated calender rolls acting cooperatively to form continuous sheet of lesser thickness than the continuous sheet exiting from the die. The final thickness may depend on the desired end-use application.

When it is desired to increase the porosity of the microporous sheet material, the sheet exiting the calender rolls is then stretched in at least one stretching direction above the elastic limit. Usually the stretch ratio is at least about 1.5, such as from 2 to about 15, such as 2 to 6.

The temperatures at which stretching is accomplished may vary widely. Stretching may be accomplished at about ambient room temperature, but usually elevated temperatures are employed. The microporous sheet may be heated by any of a wide variety of techniques prior to or during stretching. Examples of these techniques include radiative heating such as that provided by electrically heated or gas fired infrared heaters; convective heating such as that provided by recirculating hot air, and conductive heating such as that provided by contact with heated rolls.

The film surface temperatures at which stretching is accomplished may vary widely, but in general they are such that the intermediate product is stretched about evenly. In most cases, the film surface temperatures during stretching are in the range of from about 20° C. to about 220° C., such as from about 50° C. to about 200° C. and from 75° C. to 180° C.

Stretching may be accomplished in a single step or a plurality of steps as desired. For example, when the microporous sheet is to be stretched in a single direction (uniaxial stretching), the stretching may be accomplished by a single stretching step or a sequence of stretching steps until the desired final stretch ratio is attained. Similarly, when the microporous sheet is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more uniaxial stretching steps in another direction.

Various types of stretching apparatus are well known and may be used to accomplish stretching of the microporous sheet. Uniaxial stretching is usually accomplished by stretching between two rollers wherein the second or downstream roller rotates at a greater peripheral speed than the first or upstream roller. Biaxial stretching may be accomplished by simultaneously stretching in two different directions on a tentering machine. More commonly, however, biaxial stretching is accomplished by first uniaxially stretching between two differentially rotating rollers as described above, followed by uniaxially stretching in a different direction using a tenter machine. The most common type of biaxial stretching is where the two stretching directions are approximately at right angles to each other.

Stretching the microporous sheets allows for larger pore sizes than in microporous sheets conventionally processed, thus making the microporous material particularly suitable for use as filtration membranes of the present invention.

The pores within the microporous sheet that is not stretched have a volume average diameter of about 0.020 to 0.50 micrometers, where pores within the stretched microporous sheet have a volume average diameter of about 0.1 to 0.45 micrometers.

The microporous sheet or membrane is non-conductive (not electrically conductive). Therefore, to apply the ionic resinous material to the microporous membrane, the membrane must be electrically coupled to a charged electrode. This is seen from FIGS. 3 and 4.

Figure 3:
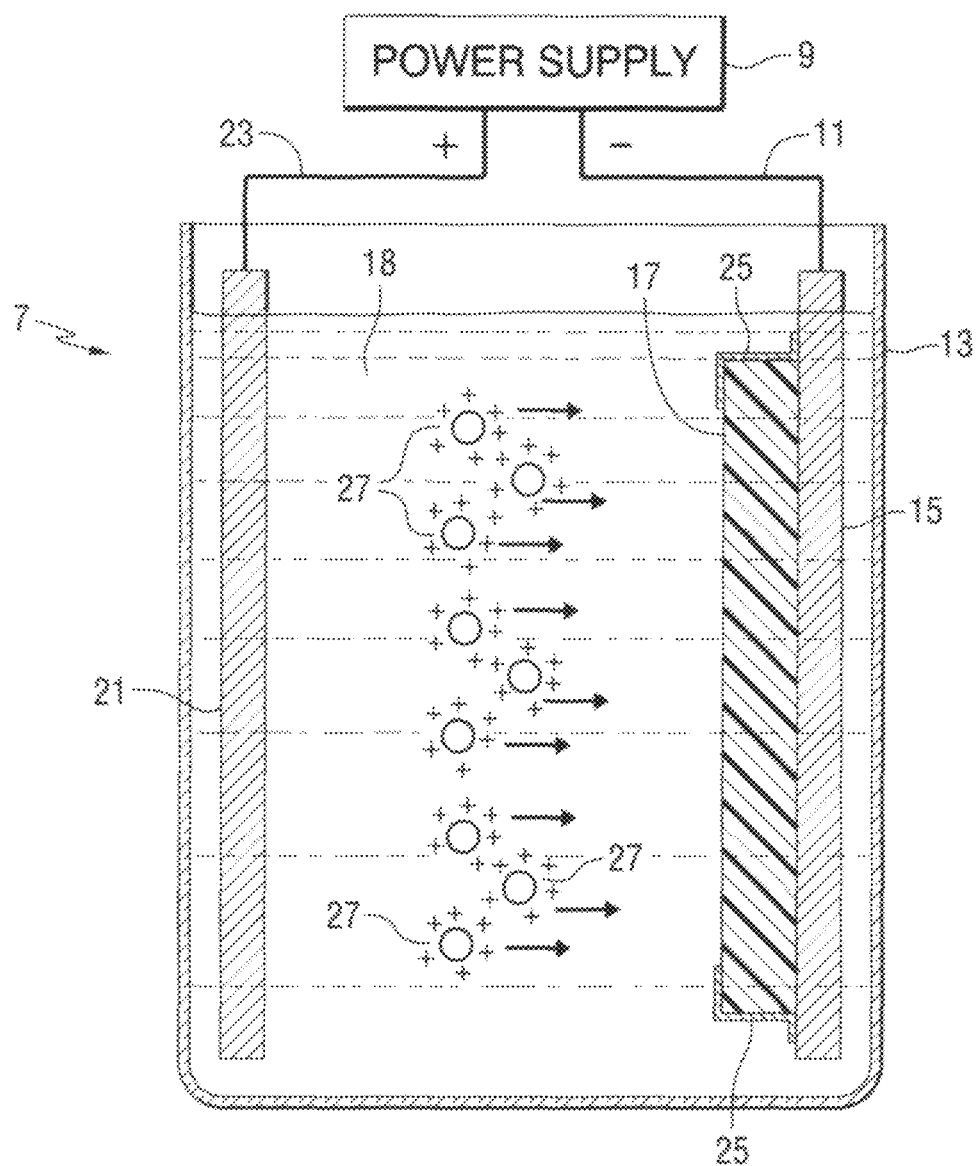
FIG. 3 shows an apparatus for the electrodeposition method of the invention.

According to the embodiment illustrated in FIG. 3, an electrodeposition system 7 may be configured to deposit a resinous material on the surface of the microporous membrane and/or into the pores of the microporous membrane 17. The electrodeposition system includes a power supply 9 capable of providing DC power. The microporous membrane is electrically coupled to a positively charged electrode 21. The electrical circuit is completed with the negatively charged electrode 15. The electrodes 15 and 21 are electrically connected to a power supply 9 through positive 23 and negative 11 electrical leads. The negatively charged electrode 15 includes a plurality of membrane securing brackets 25 to couple the non-conductive membrane 17 to the negatively charged electrode 15. The securing brackets 25 may be an adhesive device or a mechanical device such as a screw or tap. FIG. 3 also shows the positive 21 and negative 15 electrodes along with the coupled membrane 17 disposed in a container 13 containing an aqueous dispersion 18 of ionic resinous material; in this case, cationic resinous material 27.

Once the non-conductive microporous membrane is coupled to the negatively charged electrode, an electrodeposition process may be performed. As shown in FIG. 3, when the power supply 9 provides an electric current to the positive and negative electrodes, an electric field is developed in the aqueous ionic resinous dispersion 18 causing the dispersed ionic resinous material, in this case cationic resinous material, to be attracted to the negatively charged electrode 15 and consequently towards the non-conductive membrane 17. Depending upon the strength of the electric field and the porosity of the microporous membrane, the resinous precipitate deposits on the surface and/or within the pores of the microporous membrane. After electrodeposition, the treated membrane is removed from the electrodeposition system 7 and optionally further treated, typically by heating, to dry the treated membrane and possibly cure the resinous material. Typically, the electrodeposition process is conducted at a constant voltage of from 10 to 500 volts and for a relatively short period of time such as 5 seconds to 5 minutes.

Figure 4:
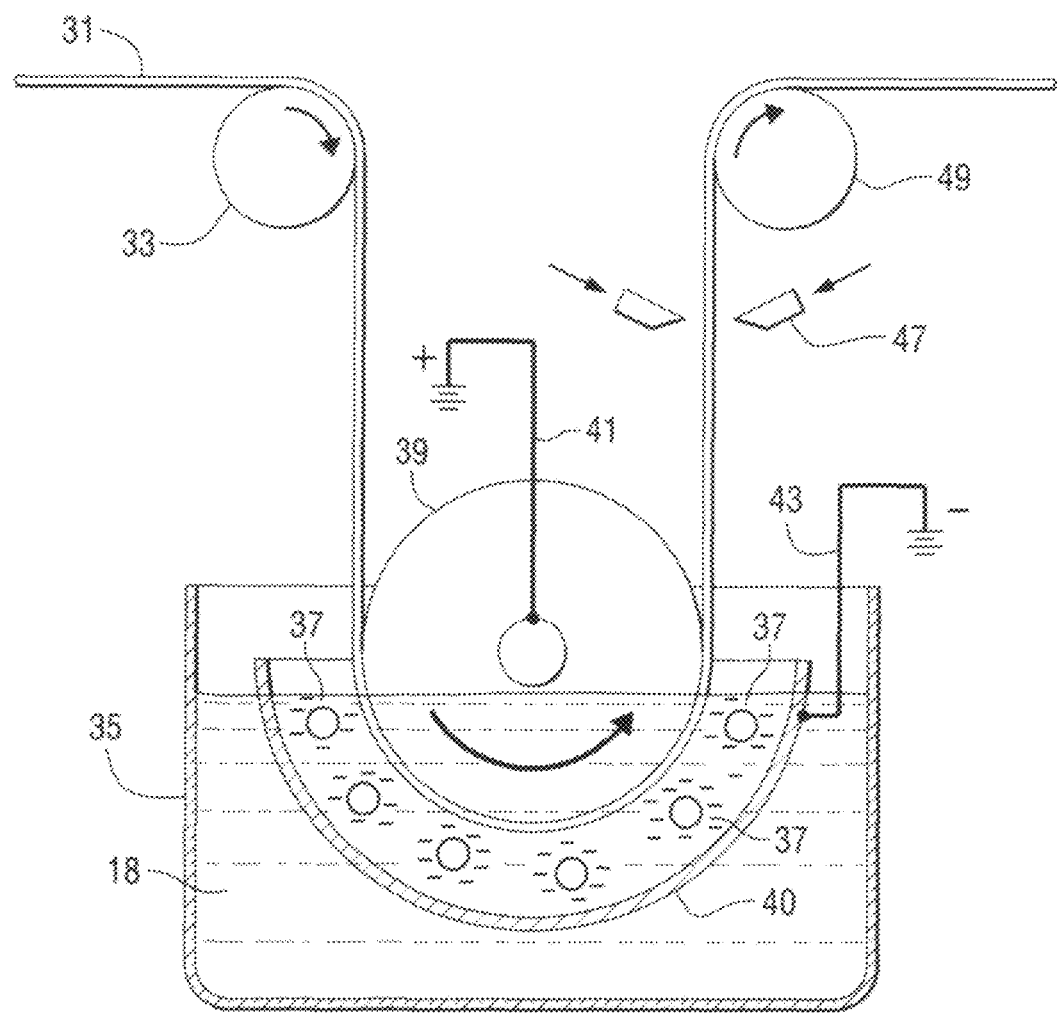
FIG. 4 shows an apparatus in which the method of electrodeposition is carried out continuously.

FIG. 4 shows an apparatus for conducting the electrodeposition process in a continuous manner. A continuous length of microporous membrane sheet material is withdrawn from a spool (not shown). The membrane sheet is passed over a transfer roller 33 and into an electrodeposition tank 35 that contains an aqueous dispersion 18 of an ionic (in this case anionic) resinous material 37. The sheet contacts and is electrically coupled to a rotating drum electrode 39 that is positively charged. A counter electrode in the form of a half-drum 40 is positioned adjacent the rotating drum 39. When electric current is supplied to the electrodes through electrical leads 41 and 43, an electric field is generated in the anionic resinous dispersion causing the dispersed anionic resinous material 37 to migrate to the positively charged rotating drum electrode 39 and consequently towards the non-conductive membrane 31 where a non-ionic resinous material precipitates on the surface and/or in the pores of the membrane 31.

The treated membrane is removed from the electrodeposition tank and passed through an air knife 45 to partially dry the membrane. The membrane is then passed over transfer roll 46 and then to a drying oven (not shown) where the microporous sheet is further dried and the resin optionally cured.

The ionic resinous materials used in the invention may be cationic or anionic resinous materials.

Examples of suitable anionic resins are base-solubilized, carboxylic acid containing polymers such as the reaction product or adduct of a drying oil or semi-drying fatty acid ester with a dicarboxylic acid or anhydride; and the reaction product of a fatty add ester, unsaturated acid or anhydride and any additional unsaturated modifying materials which are further reacted with polyol. Also suitable are the at least partially neutralized interpolymers of hydroxy-alkyl esters of unsaturated carboxylic acids such as hydroxyethyl acrylate and/or hydroxymethyl methacrylate, unsaturated carboxylic acids such as acrylic or methacrylic acid, and at least one other ethylenically unsaturated monomer such as lower alkyl esters of acrylic and methacrylic acid, for example, ethyl acrylate and butyl methacrylate. Such interpolymers or resins are commonly referred to as (meth)acrylic resins. Still another suitable electrodepositable anionic resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,857 at col. 9, lines 1 to 75, and col. 10, lines 1 to 13. Other acid functional polymers can also be used such as phosphatized polyepoxide or phosphatized acrylic polymers.

Examples of cationic resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,868 and DE-OS No. 2,707,405 can be used as the film-forming resin. Besides the epoxy-amine reaction products, film-forming resins can also be selected from cationic acrylic resins such as those described in U.S. Pat Nos. 3,455,806 and 3,928,157. Besides cationic amine salt group containing resins, sulfonium salt group containing resins can also be used. Examples of such resins are sulfonium group containing (meth)acrylic resins as disclosed in U.S. Pat. No. 4,038,232.

The ionic resinous materials are in the form of an aqueous dispersion.

The term "dispersion" is believed to be a two-phase transparent, translucent or opaque system in which the solids of the composition is in the dispersed phase and the water is in the continuous phase. The average particle size of the solids phase is generally less than 1.0 and usually less than 0.5 microns, preferably less than 0.15 micron.

The concentration of the solids phase in the aqueous medium is at least 1 and usually from about 2 to about 60 percent by weight based on total weight of the aqueous dispersion.

When the compositions of the present invention are in the form of electrodeposition baths, the solids content of the electrodeposition bath are usually within the range of about 5 to 25 percent by weight based on total weight of the electrodeposition bath.

The microporous sheets used in the invention have a light brown color that is not desirable for certain applications. Electrodepositing a coating on the surface of the sheet enables a color change of the surface such as a white surface coating for stationery and signage applications. Also, the microporous sheets have a rough or uneven surface that is undesirable for certain applications such as hot weld adhesive applications and lamination. Electrodepositing a coating on the surface of the microporous sheets results in a smoother more desirable product. Microporous sheets with an electrodeposited surface coating can also be used for separating gas, such as methane, from water with the electrodeposited coating being hydrophobic and diverting water with the methane permeating the coating and being wicked away through the microporous sheet.

The resin-treated microporous membranes with resinous material electrodeposited within the pores of the membrane, that is, from 10 to 100% through the thickness of the membrane, are useful as filtering membranes such as filtering ionic impurities from waste streams. They can be used to treat waste streams that contain ionic impurities such as those associated with the pharmaceutical, semiconductor, power generation and mining operations.

Illustrating the invention are the following examples, which, however, are not to be considered as limiting the invention to their details. Unless otherwise indicated, all parts and percentages in the following examples, as well as throughout the specification, are by weight.

EXAMPLES

Figure 5:
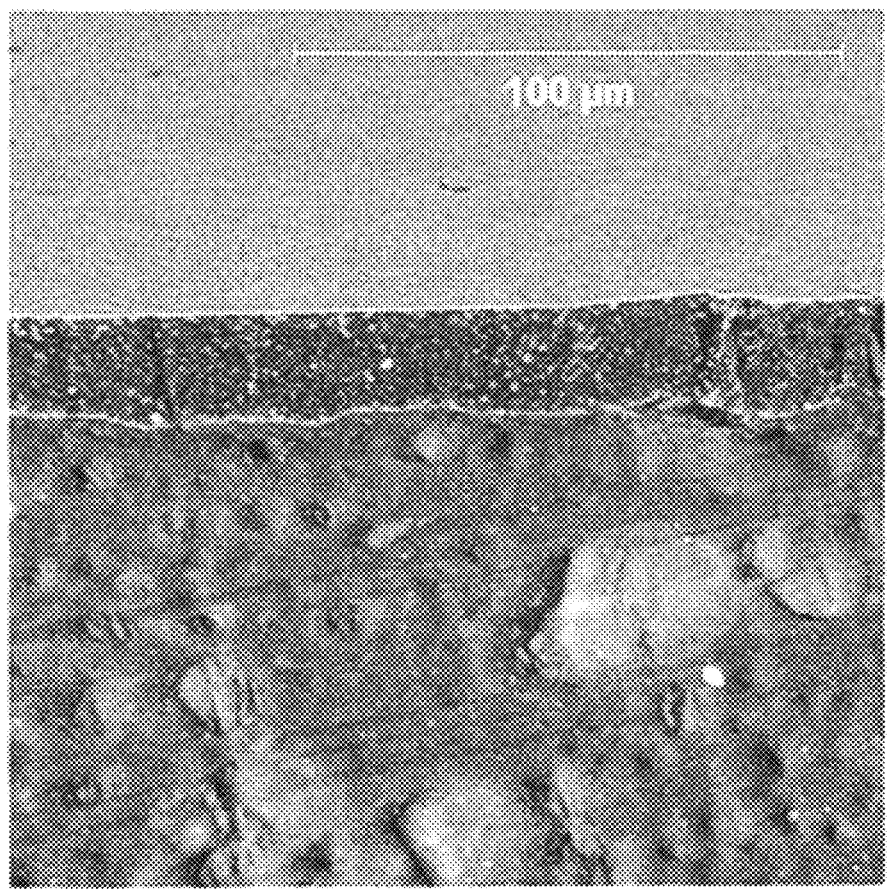
FIG. 5 is a photomicrograph of a cross section of a coated microporous membrane showing a smooth film that has been anionically electrodeposited on the surface of the microporous membrane material.
Figure 6:
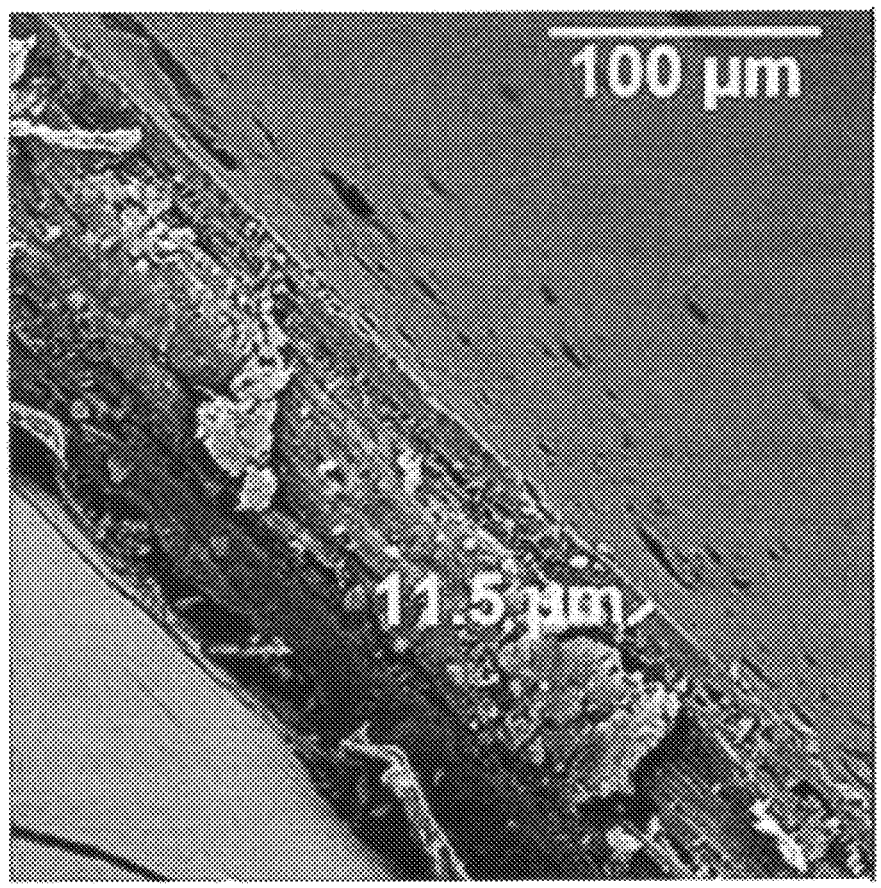
FIG. 6 is a photomicrograph of a microporous membrane that has been cationically electrodeposited showing the electrodeposited resin within the pores of the microporous membrane material.

Example 1 shows anionic electrodeposition of a coating on the surface of a TESLIN microporous sheet that was not stretched (volume average diameter of pores within the sheet of 0.029 micrometers). FIG. 5 is a photomicrograph of a cross section of the electrocoated microporous sheet.

Example 2 shows cationic electrodeposition of a coating within the pores of a TESLIN microporous sheet that was stretched biaxially (volume average diameter of pores within the sheet of 0.25 micrometers). FIG. 8 is a photomicrograph of a cross section of the electrodeposited microporous sheet.

Example 1

The anionic coating composition was made up at a bath solids of 20% and 0.20 pigment to binder weight ratio utilizing commercially available anionic resin and pigment paste from PPG industries. The electrodeposition bath formulation was as follows:

| Component | Weight in grams |
|---|---|
| Anionic Resin[1] | 1616 |
| Pigment Paste[2] | 324 |
| Deionized Water | 1860 |
| Total | 3800 |

[1]Anionic Epoxy Resin available from PPG Industries as ACRS1100.
[2]Gray pigment paste available from PPG industries as ACPP1120.

The process for electrodeposition was as follows:

Step 1—A sample of TESLIN Digital 10 microporous sheet was cut approximately 3" wide by 8" long from 10 mil sheet stock.

Step 2—The sheet was then evenly wrapped around a 4" wide×12" long C700C59 steel panel available from ACT Test Panel Technology. The 3" width of the sheet was centered with the 4" width of the panel leaving approximately 0.5" of bare panel on either side. The longer 8" section was wrapped around the length of the panel so that it was evenly distributed to the front and back of the panel giving approximately 4" of height on either side.

Step 3—The side edges of the sheet were secured with vinyl tape such that no paint was able to leak behind the sheet.

Step 4—The panel was submersed into the electrodeposition bath approximately 2½ to 3 inches. This was to ensure that no paint was able to leak behind the sheet.

Step 5—Electrical current was applied.
Additional Parameters for Example 1:

Bath temperature 75° F. (24° C.), application time of 180 seconds at 150 volts, 0.75 amps. The gray anionic electrocoat paint was successfully applied to the exterior surface of the microporous sheet. The coated sheets were cured following application for 30 minutes at 200° F. (93° C.). FIG. 5 is a cross section of the coated sheet showing a smooth film on the surface of the sheet.

Example 2

A sample of a heat-treated and stretched TESLIN substrate was coated with a cationic electrocoat to evaluate the ability of the electrocoat to penetrate a porous non-conductive substrate.

A clear, (non-pigmented), electrodepositable paint system was made up at a bath solids of 10% using POWERCRON® 840L cationic acrylic resin commercially available from PPG Industries. The bath formulation was as follows:

| Component | Weight in grams |
|---|---|
| POWERCRON 840L | 1017.7 |
| Deionized water | 1282.3 |
| Total | 2300.0 |

The coating bath had a pH of 5.04 and a conductivity of 942 μmhos.

Samples of a heat-treated and stretched TESLIN Digital 10 substrate were affixed to a 4" wisex12" long C700C59 steel panel in a manner similar to Example 1. Coat out conditions were 80° F. (27° C.) bath temperature; application time 90 seconds at 75 volts with an amperage limit of 0.75 amps. The electrocoated TESLIN substrate was rinsed with deionized water, air dried for 20 minutes, then baked for 20 minutes at 200° F. (93° C.). The resulting coated TESLIN sheet was not tacky to the touch. The electrocoat resin penetrated the TESLIN sheet and partially deposited on the panel. A photomicrograph of a cross section of the coated TESLIN sheet shows 11.5 microns of film on the surface of the sheet with significant penetration of the electrocoat resin through the sheet.

Whereas particular embodiments of this invention have been described above for purposes of illustration, if will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:

1. A method for preparing a resin-treated microporous membrane comprising a polyolefin matrix material, and finely divided, siliceous filler distributed throughout the matrix material, and a network of interconnecting pores communicating throughout the microporous membrane, wherein the microporous membrane is non-conductive; the method comprising:
   (a) coupling the microporous membrane to a charged electrode,
   (b) disposing the microporous membrane and the charged electrode into an aqueous dispersion of an ionic resin; the resinous dispersion also containing an oppositely charged or counter electrode forming an electrical circuit with the charged electrode,
   (c) passing electric current between the charged electrode and the counter electrode to cause the ionic resinous material to migrate to the charged electrode and consequently to the microporous membrane.

2. The method of claim 1 wherein the resin is electrodeposited on the surface of the microporous membrane.

3. The method of claim 1 wherein the resin is electrodeposited in the pores of the microporous membrane.

4. The method of claim 1 in which the polyolefin matrix material comprises polyethylene.

5. The method of claim 4 in which the polyethylene has an intrinsic viscosity of at least 18 deciliters per gram.

6. The method of claim 1 in which the siliceous material is precipitated silica.

7. The method of claim 6 in which the silica has a volume average gross particle size ranging from 1 to 300 nanometers.

8. The method of claim 1 in which the siliceous filler is present in the matrix material in amounts of at least 50 percent by weight based on total weight of the membrane.

9. The method of claim 1 in which the pores of the membrane have a volume average diameter of 0.02 to 0.5 micrometer.

10. The method of claim 1 in which the ionic resin is a cationic resin and the charged electrode is a cathode.

11. The method of claim 1 wherein the ionic resin is an anionic resin and the charged electrode is an anode.

12. The method of claim 1 in which the microporous membrane is stretched in a single direction or in two directions.

* * * * *